No. 894,463. PATENTED JULY 28, 1908.
M. A. REPLOGLE & H. C. HALE.
TURBINE WATER WHEEL.
APPLICATION FILED DEC. 14, 1904.
3 SHEETS—SHEET 2.
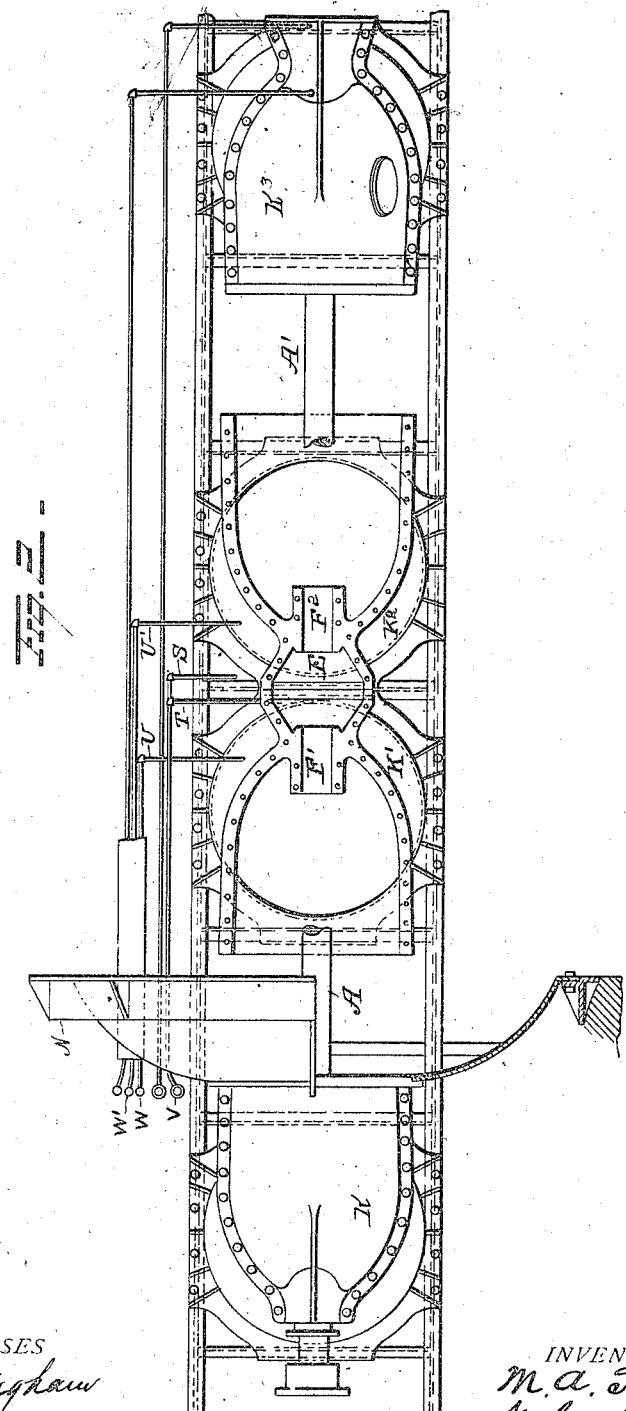

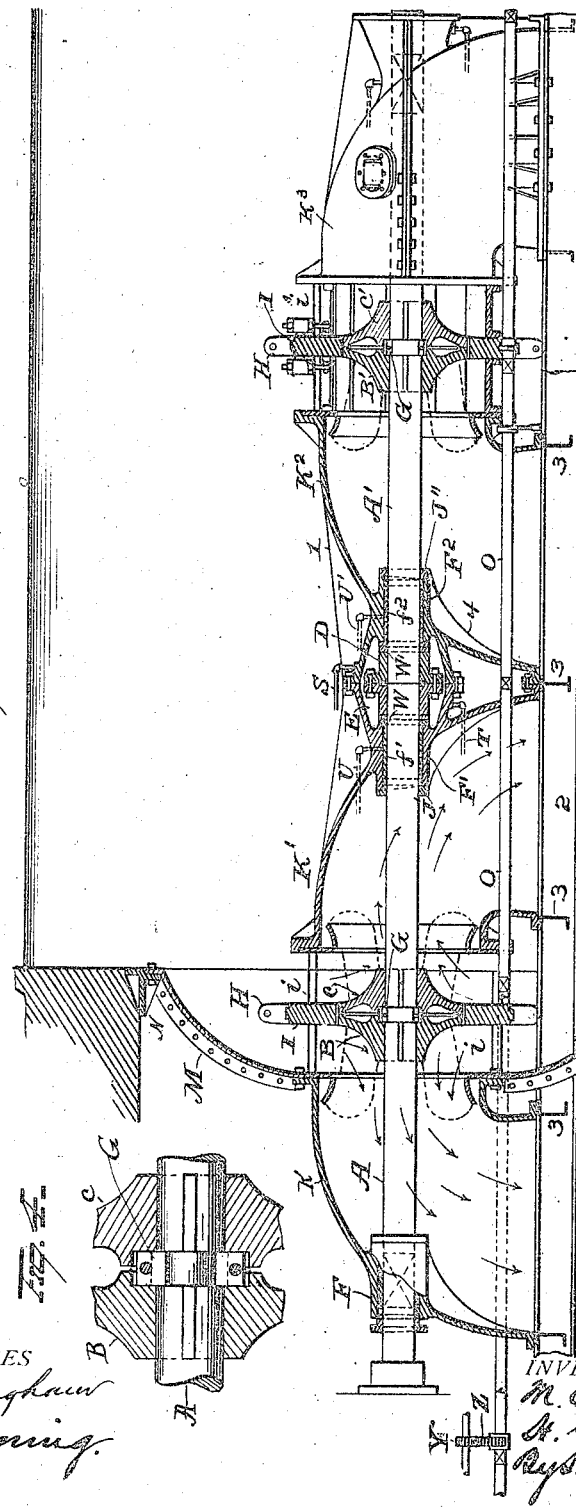

No. 894,463. PATENTED JULY 28, 1908.
M. A. REPLOGLE & H. C. HALE.
TURBINE WATER WHEEL.
APPLICATION FILED DEC. 14, 1904.
3 SHEETS—SHEET 3.
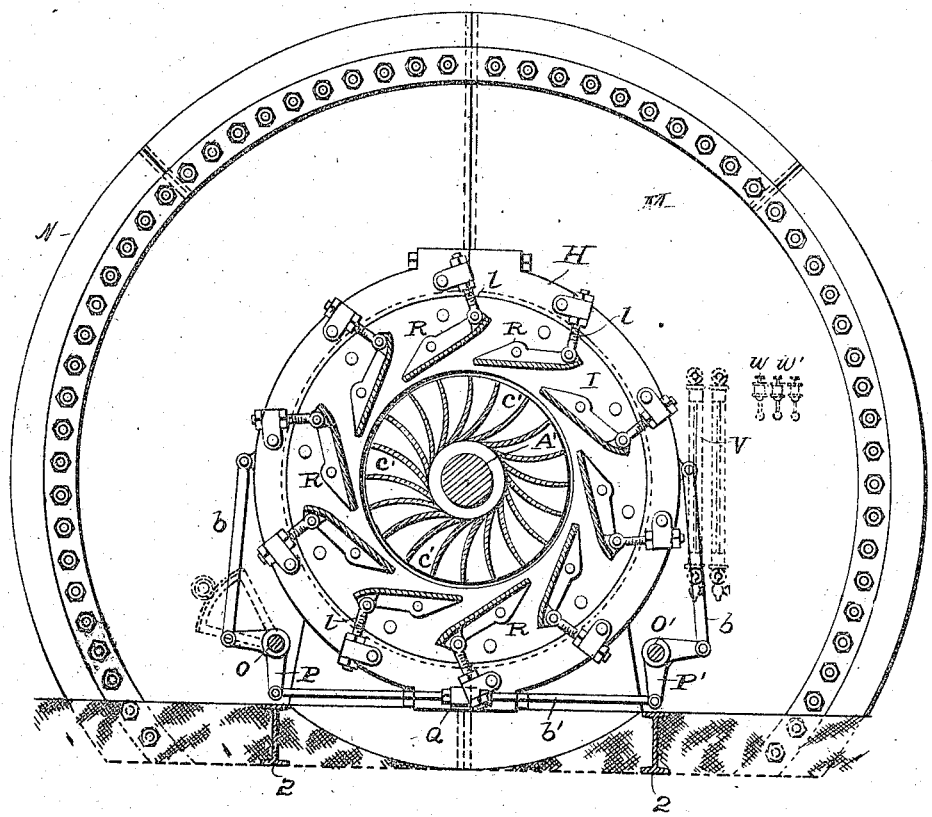
WITNESSES
INVENTORS
Attorney

UNITED STATES PATENT OFFICE.

MARK A. REPLOGLE AND HERBERT C. HALE, OF AKRON, OHIO, ASSIGNORS TO THE WELLMAN-SEAVER-MORGAN COMPANY, OF CLEVELAND, OHIO.

TURBINE WATER-WHEEL.

No. 894,463.      Specification of Letters Patent.      Patented July 28, 1908.

Application filed December 14, 1904. Serial No. 236,834.

*To all whom it may concern:*

Be it known that we, MARK A. REPLOGLE and HERBERT C. HALE, residents of Akron, in the county of Summit and State of Ohio, have invented certain new and useful Improvements in Turbine Water-Wheels; and we do hereby declare the following to be a full, clear, and exact description of the invention, such as will enable others skilled in the art to which it appertains to make and use the same.

Our invention relates to improvements in turbine water wheels, and more particularly to unified, or double turbines, or multiples of same, mounted on horizontal shafts, but may be used in connection with any turbine or turbine system mounted on horizontal or vertical shafts.

The objects of the invention are to so unite and group the various parts comprising a water wheel system that the space required for two or more wheels is reduced to a minimum, while preserving ideal hydraulic conditions, to provide an inclosed system of bearings and circuits for their lubrication with means to force lubricant into the bearings or withdraw the same, as well as means for determining the amount of lubricant about the bearings, notwithstanding that the bearings are running under water.

Further objects are to provide a system of shaft couplings and lubricated thrust bearings that have ample shaft space for their perfect operation yet do not require an increase in the length of the turbine shaft beyond that which is necessary to span the draft tubes; to provide a construction that is self contained, insuring a perfect alinement of the turbine shaft bearings by having the wheel curbs, draft tubes, and bearing receptacles of the whole system finished doweled and bolted together, making one harmonious whole. And a further object is to provide a system of gate operating levers that is free from cogs or rollers under water, having such connections and adjustments that the weight of the gate operating ring may be supported by vertically disposed connecting rods, thereby reducing its friction to a minimum.

With these objects in view, the invention consists in certain novel features of construction and combinations and arrangements of parts as will be more fully hereinafter described and pointed out in the claims.

In the accompanying drawings, Figure 1 is a central vertical longitudinal section of two double turbines, showing coupling and bearings. Fig. 2 is a plan view illustrating the lubricant pipes, and Fig. 3 is a view in end elevation showing the gate operating system and the glass lubricant gages in dotted lines. Fig. 4 is an enlarged detail view showing the connection between the turbine runners and the shaft.

1 represents the turbine casing comprising separable quarter turn draft pipes or suction tubes $K$, $K'$, $K^2$, $K^3$, preferably of the shape shown, and supported and braced by longitudinal and lateral beams 2 and 3. The end of the casing is connected to a bulkhead M secured by a supporting ring N.

A and $A'$ represent the two members of the turbine shaft, coupled together by a flange coupling D. B and C are a pair of turbine runners, set back to back and are keyed to shaft member A, and $B'$, $C'$ are a similar pair of turbine runners, keyed to the shaft member $A'$.

The pipe or casing sections $K'$, $K^2$, are provided with enlargements 4 secured together and forming boxes $F'$, $F^2$ for the turbine shaft. The interior of each enlargement 4 is recessed so that said enlargements coöperate to form a water-tight lubricant chamber E between the bearing boxes. Within the chamber E (which is between two pipe or casing sections $K'$ $K^2$ and entirely outside the same), the coupling D is inclosed. The pipe or casing section K is also provided with a bearing box F for the shaft A. In these bearings split bearing sleeves $f'$ and $f''$ of any approved bearing metal, are located, and in grooves around the shaft members A $A'$, split collars G are located between the respective turbine runners and in grooves or recesses therein and absolutely prevent movement of the runners longitudinally of the shaft.

Around each pair of runners, is a stationary ring I supported by rods $i$, passed therethrough and secured to casing 1. Around these rings I and grooved to fit the same, are split sliding rings H, connected by adjustable rods $l$ with gates R, pivoted between their ends to stationary rings I, so that by moving the ring H, all of the gates R will be simultaneously moved to open or close as the case may be.

Parallel shafts O and O' are located outside of and below rings H and have bell crank levers P, P', thereon connected by links b with ring H, and connected together by a rod b' having a turnbuckle Q between its ends to permit the parts to be properly adjusted. Shaft O extends through the end of casing 1 and has a gear segment Z thereon in mesh with a pinion Y, which latter is under the control of the operator and when turned the gates will be simultaneously moved as will be readily understood, and it will be observed that with this construction of gate operating mechanism, there are no gears or other parts beneath the water, which might rust and interfere with the perfect operation of the apparatus.

With the upper portion of lubricant receptacle E a lubricant supply pipe S communicates and lubricant is drained from the receptacle E by a pipe T, both of which are connected at one end by a glass tube or gage V which indicates at all times the level of lubricant in the receptacle E.

Lubricant pipes U U' connect supply cups w, w¹ with bearings F' and F² respectively, and thrust rings W, W' fill the spaces between coupling D and the metallic bushings f', f''.

In practice the structure shown in Fig. 1 is known as a penstock unit, and may consist of any number of similar pairs of turbines with shafts, couplings, bearings, and quarter turns, with the necessary lubricating systems, gates and operating levers. The several turbines are submerged in the head water and discharge each into its respective quarter turn, which conducts the water into the common tail race below. The several pairs of turbines may have their gates operated simultaneously by means of the operating shaft O. It can readily be seen that when installed, the casing or the several casings, are so joined as to make one complete self-contained power unit, shortening considerably the penstock unit as compared with the common practice of installing the turbines singly on one shaft.

It will be noted that the sections K' and K'' of casing 1 have elongations or bearings F', F'' above referred to, which enlarge into lubricating cavity E. This cavity must be large enough to loosely incase coupling D, with enough remaining space to hold a quantity of oil or other approved lubricant. Oil may be forced into chamber E by any approved method through pipe S and may be drawn off in like manner by pipe T. It might be added that the tendency to a vacuum caused by the discharge water in a measure prevents water from entering the lubricating cavity E, the tendency being for the oil to pass out rather than for the water to pass in, and the common stuffing boxes J' and J'' practically stop all interchange of liquids. However, the actual condition of cavity E can be determined by a glance at the gage V.

Turbine runners B and C normally balance each other as far as end thrust is concerned. Local disturbances may cause the end thrust to be unequal. This is provided for, first by split collar G, which prevents any end movement of turbine runners B and C on shaft A. Shaft members A and A' being keyed solidly to coupling D, are prevented from moving endwise by the rings W W' in the lubricating cavity E. The rings or loose collars W W' each have two sliding or bearing surfaces, running in oil, which makes a very desirable thrust bearing. Further we would call attention to the fact that as the casting forming cavity E and bearings F', F'' is split centrally and a half section carried by each of the penstock sections K' and K'', the bearing can be separated far enough to admit coupling D and collars W, W' without increasing the lengths of the penstock unit, which is a very desirable feature, as the whole unit is shortened by an amount equal to the sum of the coupling spaces, in addition to that shortened by setting the turbine runners back to back.

It is understood the ring H operates the full system or circle of gates for each one of the turbine runners, each gate being operated by the connecting rod. In ordinary practice ring H or its equivalent, is operated directly by cog gears which are necessarily under water.

In the arrangement shown in Fig. 3 ring H is operated by the rocking of bell cranks P, P' through the connecting rods. By means of turnbuckle Q the distance between the bell crank arms may be adjusted so as to throw the whole or part of the weight of ring H on shafts O and O' thereby reducing the friction that would otherwise occur in sliding ring H on ring I.

The set of levers shown must of course be duplicated for each additional pair of turbines and they also reduce the gate operating mechanism to the simplest possible form.

A great many slight changes might be made in the general form and arrangement of the parts described without departing from our invention and hence we would have it understood that we do not restrict ourselves to the precise details set forth but consider ourselves at liberty to make such slight changes and alterations as fairly fall within the spirit and scope of our invention.

Having fully described our invention what we claim as new and desire to secure by Letters-Patent, is:—

1. In an apparatus of the character described, the combination with a shaft having an annular groove, of turbine runners placed back to back on said shaft and having internal annular grooves, and a split collar located in the annular groove in the turbine runners and the shaft.

2. In an apparatus of the character described, the combination with shaft sections, of a casing having bearings for said shaft sections, and a lubricant receptacle at the meeting ends of said shaft sections, and a coupling for said shaft sections located in said lubricant receptacle.

3. In an apparatus of the character described, the combination with a casing and two shaft sections, of pairs of turbine runners on each section, a coupling connecting said shaft sections, and a lubricant receptacle inclosing said coupling.

In testimony whereof, we have signed this specification in the presence of two subscribing witnesses.

MARK A. REPLOGLE.
HERBERT C. HALE.

Witnesses:
S. H. PITKIN,
J. H. STRATTON.